Figure 1:
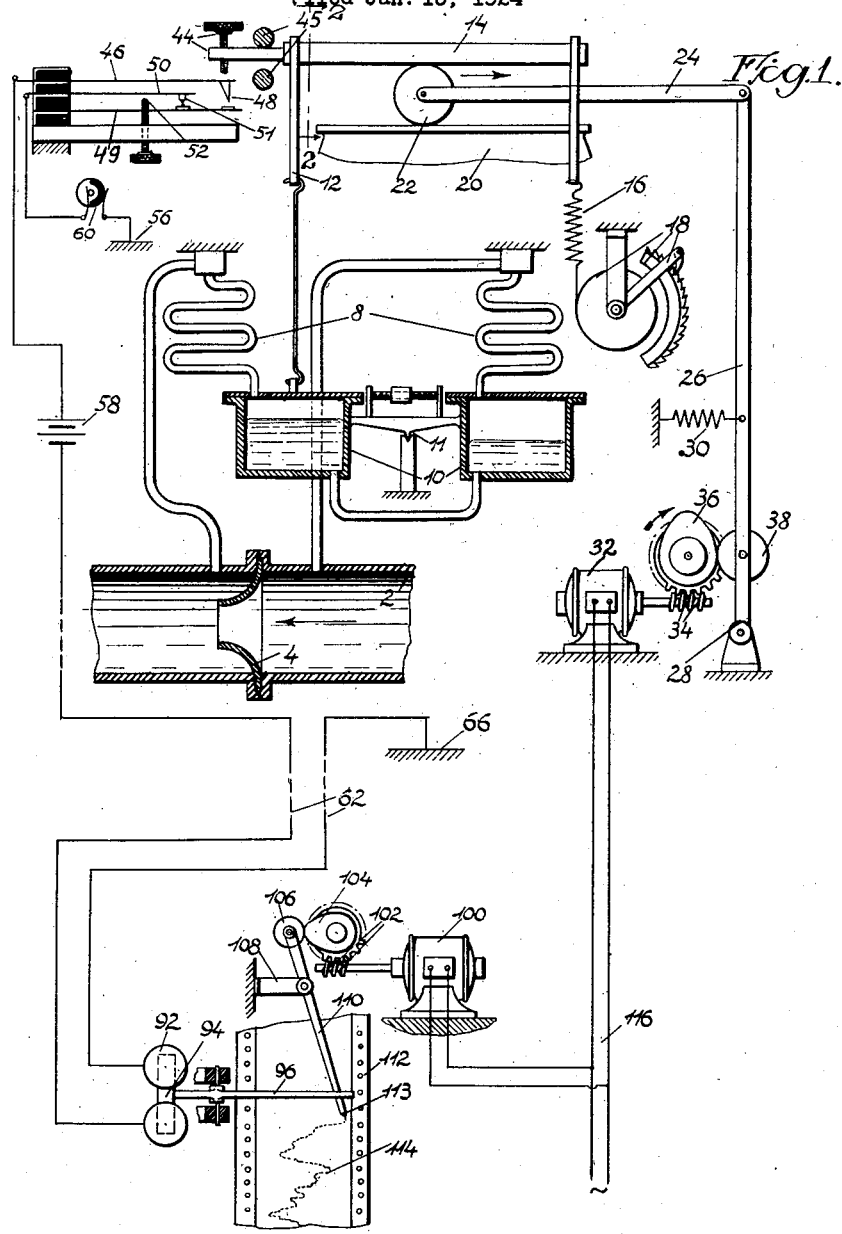

Aug. 9, 1927.

E. ROUCKA 1,638,105

SYSTEM FOR TRANSMITTING VARIABLE CONDITIONS

Filed Jan. 15, 1924

INVENTOR
Erich Roucka

BY
ATTORNEYS.

Patented Aug. 9, 1927.

1,638,105

UNITED STATES PATENT OFFICE.

ERICH ROUČKA, OF BLANSKO, CZECHOSLOVAKIA.

SYSTEM FOR TRANSMITTING VARIABLE CONDITIONS.

Application filed January 15, 1924, Serial No. 686,330, and in Czechoslovakia January 16, 1923.

This invention relates in general to a system for transmitting or measuring variations in a valve, such as a quantity, quality or condition, or for controlling or other desirable purposes, the variations in the value being transmitted during equal intervals of time by means of an auxiliary power, impulses or changes of which are controlled by the variations in the value, and the relation or time position of said impulses or changes in the auxiliary energy to or in the corresponding intervals are functions of the value and a measure therefor. The impulses of auxiliary energy affect a measuring, controlling or other suitable device. Such a system commonly includes means sensitive to variations in the value to be measured or transmitted cooperating with means operating in regular cycles of equal intervals of time, for producing sudden changes or impulses of auxiliary energy at different time positions in corresponding intervals of time determined by the then magnitude of the condition being transmitted, and a receiving or measuring means adapted to be actuated in accordance with said time positions of the impulses; and a system as described is satisfactory for measuring or transmitting many different values.

Many other values, however, act upon or actuate a sensitive system, such as described, to produce an expression or effect, such as a mechanical force or the position of a movable member, which is in non-proportional or substantially quadratic relation to the value being measured or transmitted. Therefore, in such cases, to produce impulses of auxiliary energy the time positions of which in corresponding intervals of time are proportional to the original value being measured, it is necessary to employ means for applying an auxiliary value which is varied or changed in a manner corresponding to the reverse law, i. e. the relation between the magnitude of the original value and the expression of or effect produced by the magnitude of said value in the sensitive system, to the sensitive means actuated by the original condition to produce or control production of impulses of auxiliary energy for actuating the receiving or measuring means.

The primary object of the present invention is to provide a system of the character described including a transmitting or gearing means for varying an auxiliary value in accordance with the irregular expression of the original value being measured and means for applying said auxiliary value to the sensitive means to produce impulses of auxiliary energy the time positions of which in corresponding intervals of time are proportional or in some other definite relation to the variations in the value being measured.

Other objects are to provide in a system of the character described means for compensating the substantially quadratic relation between the original value being measured and the expression of said value in the sensitive system; to provide in such a system mechanical means for varying and applying an auxiliary value to the sensitive means actuated by said original value to control production of impulses of auxiliary energy; to provide such a system including a cam and lever mechanism for producing and varying an auxiliary value in cycles of regular intervals of time to cooperate with the system sensitive to the variations in the original value to control production of impulses of auxiliary energy whereby the time positions of said impulses in corresponding intervals are proportional or in some other definite relation to the magnitudes of the original value, and to obtain other results and advantages as may be brought out by the following description.

In the accompanying drawing I have schematically shown a system embodying the invention for measuring or transmitting variations in the flow of a fluid, but it will be understood that this is mainly for the purpose of illustrating the principles of the invention and that the invention is susceptible of use with other types of systems without departing from the spirit or scope thereof.

Figure 2:
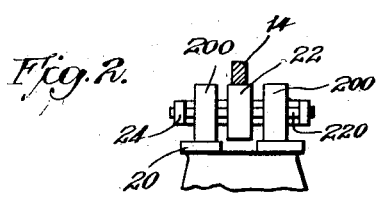

In said drawings,

Figure 1 is a schematic partial section and partial side elevation of the system, and Figure 2 is a transverse sectional view, taken on the line 2—2 of Figure 1.

Specifically describing the illustrated embodiment of the invention, the flow of fluid through a conduit 2 is the original value or condition to be measured or transmitted, and the conduit 2 has arranged therein a flow resistance device 4 which produces differences in pressure in the conduit at opposite sides thereof. These differences in pressure actuate or influence a known type of pressure sensitive device 10 which comprises two mercury containing chambers connected by a conduit and balanced on a fulcrum 11, one of said chambers 10 being connected to the conduit 2 at each side of the flow resistance device 4 by means of flexible tubes 8. Obviously, differences in pressure at opposite sides of the flow resistance device 4 will affect the balance of the device 10, and this expression of the magnitude of the flow of fluid or mechanical force produced in the device 10 by the difference in pressure is in quadratic relation to the flow of fluid.

The force produced in sensitive device 10 cooperates with or is compensated by an auxiliary value variable in regular cycles of equal intervals of time to produce impulses of an auxiliary energy during said intervals of time. In accordance with the invention the time positions of said impulses of auxiliary energy in corresponding intervals of time are to be proportional to the variations in the flow of fluid in the conduit 2, and obviously to produce this result the regularly variable auxiliary value must be varied according to a quadratic law.

It is the purpose of the invention to provide means between the regularly variable auxiliary value and the sensitive device 10 to compensate or eliminate this quadratic law in the operation of the system. For this purpose, one of the chambers of the sensitive device 10 is connected by a link 12 to one end of a lever 14 fulcrumed on a roller 22 journaled on an axle 220 which is mounted upon rollers 200 to roll on a fixed bearing 20. The other end of said lever 14 is connected to a tension spring 16 the tension of which is varied by means of a drum revoluble on a fixed support by means of a lever, as indicated at 18. The axle 220 is connected by a draw bar 24 to one end of a lever 26 pivotally connected at its other end to a fixed support, as at 28. Said lever carries intermediate its ends a follower roller 38 which is adapted to engage a cam 36 constantly revolved through worm and worm wheel gearing 34 by a motor 32. Engagement of the roller 38 with the cam 36 is maintained by a spring 30. With this construction, it will be observed that the position of the fulcrum roller 22 will be constantly varied in regular cycles of equal intervals of time each determined by one revolution of the cam 36.

At some moment during each of said intervals of time, due to the varying position of the fulcrum roller 22, the force produced by the unbalancing of the sensitive device 10 will be compensated or balanced by the force exerted in opposition to the spring 16 through the lever 14 whereby the lever 14 will be oscillated. This lever 14 cooperates with means for producing or controlling production of impulses of auxiliary energy. In the present instance, the auxiliary energy is in the form of electricity, and the lever 14 cooperates with a switch mechanism to close and open the circuit of the auxiliary energy. For this purpose, the end of the lever 14 connected to the sensitive device 10 carries a screw 44 adapted to engage a spring strip 46 having a contact 48 adapted to cooperate with a second spring strip 49 carrying a contact to cooperate with the contact on a strip 50 intermediate the strips 49 and 46. The strip 46 is connected to one side of a source 58 of electricity, while the strip 50 is connected to the ground, as at 56. The other side of the source 58 is connected by wire 62 to a receiving or measuring apparatus which is also connected to the ground as at 66. With this construction, it will be noted that the circuit through the source 58 is normally open and that when the lever 14 is oscillated to cause engagement of the screw 44 with the strip 46, the circuit through the source 58 will be closed whereby an impulse of electricity is produced. The duration of said impulse is momentary and ceases upon further movement of the lever 14 which disengages the contacts 51. An insulated screw 52 is provided for adjusting the contact 51.

The principles of levers being understood it will be obvious that the moment of one end of the lever 14 is proportional to the moment of the other end and the magnitude of the force exerted by the spring 16 through the lever 14 in opposition to the force created by the sensitive device 10 will be proportional to the magnitude of the latter force. Accordingly the lever 14, fulcrum roller 22, cam 36 and lever 26 serve to compensate or eliminate the quadratic relation between the force produced by the sensitive device and the magnitude of the flow of fluid from the expression of the magnitude of the condition by the impulse of auxiliary energy, and therefore the time positions of the impulses of auxiliary energy produced by the lever 14 and switch mechanism 46—50, are proportional to the corresponding magnitudes in the flow of fluid, it being understood that one impulse is produced during each revolution of the cam 36 and that the time position of said impulse in said interval is determined by the moment of oscillation of the lever 14 which is in turn controlled by the cooperation of the sensitive device 10 and the spring 16.

Any suitable receiving means may be utilized to indicate the time positions of the impulses of auxiliary energy, and in the present instance I have shown a receiving means heretofore described in several of my copending applications. This means includes an electric motor 100 driven synchronously with the motor 32 and which may be connected to the same source of alternating current 116 as the motor 32. The motor 100 drives through worm and worm wheel gearing 102 a cam 104 so that each revolution of the cam 104 is synchronous with each revolution of the cam 36. A lever 110 is pivotally mounted intermediate its ends on a fixed support 108 and carries at one end a roller 106 which follows the cam 104. The other end of the lever 110 carries a pen point 113 adapted to cooperate with a traveling record strip 112. The pen point 113 is normally spaced from the record strip 112 and is constantly oscillated transversely of the strip by the cam 104. A lever 96 is pivotally mounted intermediate its ends on a fixed support with one end overlying the end of the lever 110 carrying the pen point. The other end of the lever 96 carries an armature 94 cooperating with electromagnets 92 connected in circuit with the source 58 of auxiliary energy. With this construction, upon each impulse of auxiliary energy, the electromagnets 92 are energized so as to attract the armature 94 and oscillate the lever 96 to force the pen point 113 into engagement with the record strip 112, whereby a dot is produced on the record strip indicating the time position of the impulse in the interval of time determined by the cams 36 and 104. The record of the time positions of the various impulses consists of a continuous line 114 of dots.

To prevent an impulse of auxiliary energy being produced upon return of the lever 14 to its normal position, a rotary switch mechanism 60 is arranged in the circuit of the source 58, said switch being rotated synchronously with the cam 36 and having conducting and insulating portions engaged by brushes whereby the impulse may be produced only during movement of the screw 44 toward the strip 46.

It should be understood that the present application is based particularly upon the transmitting apparatus, the general combination of transmitting apparatus of this type and receiving means to cooperate therewith being described and claimed in my copending application Serial No. 625,153, filed March 14, 1923. Impulse transmitting systems of this general character are also disclosed in Patents Nos. 1,412,586 and 1,434,064 of April 11, 1912, and October 31, 1922, respectively.

While I have shown and described mechanism embodying certain details of construction, it will be understood that it is within the scope of the invention to modify or change these details or utilize other mechanism within the skill of a mechanic to produce the objects of the invention. Therefore, I do not desire to be understood as limiting myself except as required by the following claims when construed in the light of the prior art.

Having thus described the invention, what I claim is:

1. In a system for transmitting variable conditions, the combination of means movably sensitive to a condition which exerts a force corresponding and in quadratic relation to the magnitude of the condition, a lever, means mounting said sensitive means to exert its force on one end of said lever, a movable fulcrum for said lever intermediate its ends, means for exerting a constant auxiliary force upon the other end of said lever opposing the first force, a cam revoluble in regular cycles of equal intervals of time and operatively connected to said fulcrum to regularly vary the position of the latter to balance said forces, and means for producing an impulse of auxiliary energy actuated by said lever when said forces are balanced, whereby the time position of said impulse in the cycle is proportional or in other predetermined relation to the magnitude of said condition.

2. In a system for transmitting variable conditions, the combination of means movably sensitive to a condition to be transmitted wherein the expression of the magnitude of said condition is a force not proportional to the magnitude of the condition, a lever, means mounting said sensitive means to exert its force upon said lever, a movable fulcrum for said lever, means for exerting a constant auxiliary force upon said lever opposing the first force, means for varying the position of said fulcrum in regular cycles of equal intervals of time to cause a balancing of said forces, and means for producing an impulse of auxiliary energy actuated by said lever when said forces are balanced. whereby the time position of said impulse in the cycle is proportional or in other predetermined relation to the magnitude of said condition.

3. In a system for transmitting variable conditions, the combination of means movably sensitive to a condition to be transmitted which exerts a force which corresponds but is in some other than proportional relation to the magnitude of the condition, movable means mounted with respect to said sensitive means to be moved by said force, means for exerting a constant auxiliary force upon the second-mentioned means opposing the first force, means for varying the magnitude of the opposition by said auxiliary force to the first force in regular cycles of equal intervals of time proportionally to variations in said first force to balance said forces, and means for producing an impulse of auxiliary energy actuated by the second-mentioned means when said forces are balanced, whereby the time position of said impulse in the cycle is proportional to the magnitude of said condition.

4. In a system for transmitting variable conditions, the combination of means movably sensitive to a condition to be transmitted which exerts a force which corresponds but is in some other than proportional relation to the magnitude of the condition, means for exerting a constant auxiliary force in opposition to the first force, means for varying the magnitude of the opposition by the second force to said first force proportionally to the variations in said first force in regular cycles of equal intervals of time, to balance said forces, and means for controlling production of impulses of auxiliary energy actuated by cooperation of said first-two-mentioned means when said forces are balanced, whereby an impulse of auxiliary energy is produced at a time position in the corresponding cycle proportional to the magnitude of said condition when said forces are balanced.

ERICH ROUČKA.